(12) United States Patent
Mansingh

(10) Patent No.: US 6,199,089 B1
(45) Date of Patent: Mar. 6, 2001

(54) FLOATING POINT ARITHMETIC LOGIC UNIT ROUNDING USING AT LEAST ONE LEAST SIGNIFICANT BIT

(75) Inventor: Sanjay Mansingh, Santa Clara, CA (US)

(73) Assignee: ATI International SRL, Hastings (BB)

( * ) Notice: Subject to any disclaimer, the term of this patent is extended or adjusted under 35 U.S.C. 154(b) by 0 days.

(21) Appl. No.: 09/156,817

(22) Filed: Sep. 18, 1998

(51) Int. Cl.[7] .................................................... G06F 7/38
(52) U.S. Cl. ............................................ 708/497; 708/498
(58) Field of Search ........................... 708/490, 496–499, 708/501, 503, 505, 523, 550–553

(56) References Cited

U.S. PATENT DOCUMENTS

| | | | |
|---|---|---|---|
| 4,161,784 | 7/1979 | Cushing et al. | 364/748 |
| 5,170,371 | * 12/1992 | Darley | 708/551 |
| 5,268,855 | 12/1993 | Mason et al. | 364/748 |
| 5,550,767 | * 8/1996 | Taborn et al. | 708/205 X |
| 5,627,773 | 5/1997 | Wolrich et al. | 364/715.03 |
| 5,630,160 | 5/1997 | Simpson et al. | 395/800 |
| 5,631,859 | 5/1997 | Markstein et al. | 364/748 |
| 5,644,522 | * 7/1997 | Moyse et al. | 708/551 |

* cited by examiner

Primary Examiner—Ohuong Dinh Ngo
(74) Attorney, Agent, or Firm—Skjerven Morrill MacPherson LLP; Edward C. Kwok; Michael J. Halbert

(57) ABSTRACT

A floating point unit includes a rounding unit that rounds the two least significant bits of a sum. After a sum of the two mantissas is generated the at least one least significant bit is separated from the sum. When addition is performed, two least significant bits are separated from the sum. A half add unit may be used to generate the sum along with a set of carry data, and thus at least one least significant bit of the carry data is also separated. A rounding unit receives the separated at least one least significant bit of the sum and carry data and produces a carry in bit as well as rounded at least one least significant bit. The sum and carry data are then summed in a later stage of the floating point unit to form both a unincremented sum and an incremented sum, which are stored in a multiplexer. The carry in bit is used to select one of the unincremented sum and incremented sum. The rounded at least one least significant bit produced by the rounding unit is then united with the selected one of the unincremented sum and incremented sum.

20 Claims, 11 Drawing Sheets

| SIGN a | OPERATION | SIGN b | ABSOLUTE OPERATION | a > b? | RESULT SIGN (N) |
|---|---|---|---|---|---|
| + | + | + | \|a\|+\|b\| | NA | + |
| − | + | − | | NA | − |
| + | − | − | | NA | + |
| − | − | + | | NA | − |
| − | + | + | \|a\|−\|b\| | 1 | − |
| | | | | 0 | + |
| + | + | − | | 1 | + |
| | | | | 0 | − |
| + | − | + | | 1 | + |
| | | | | 0 | − |
| − | − | − | | 1 | − |
| | | | | 0 | + |

Figure 4

```
              A4 A3 A2 A1 A0
Mantissa  A  [ 1| 0| 1| 1| 1]

B4 B3 B2 B1 B0
Mantissa  B  [ 1| 0| 1| 0| 1]

S4 S3 S2 S1 S0
Sum          [ 0| 0| 0| 1| 0]

Cout C4 C3 C2 C1 C0
Carry        [ 1| 0| 1| 0| 1| 0]
```

Figure 5

| N (sign) | rnd mode | L | r | s | rnd up |
|---|---|---|---|---|---|
| X | towards 0 | X | X | X | 0 |
| +ve | towards +∞ | X | 0 | 0 | 0 |
| +ve | towards +∞ | X | 1 | X | 1 |
| −ve | towards +∞ | X | X | X | 0 |
| +ve | towards +∞ | X | X | 1 | 1 |
| −ve | towards −∞ | X | 0 | 0 | 0 |
| −ve | towards −∞ | X | 1 | X | 1 |
| −ve | towards −∞ | X | X | 1 | 1 |
| +ve | towards −∞ | X | X | X | 0 |
| X | nearest even | X | 1 | 1 | 1 |
| X | nearest even | X | 1 | 0 | 0 |
| X | nearest even | 1 | 1 | X | 1 |
| X | nearest even | 0 | 1 | X | 0 |
| X | nearest even | X | 0 | X | 0 |

X - Do not care (1 or 0)

$r_{ovf}$ = S0$_{ovf}$ OR [S1$_{ovf}$ AND [Cin$_{novf}$ OR cpa$_4$ ]]

Case 1: No Overflow ($r_{ovf}$ = 0)

Cin = Cin$_{novf}$ OR cpa$_4$ rLsb$_1$ = rLsb'$_{novf}$ rLsb$_0$ = rLsb$_{novf}$ Case 2: Overflow ($r_{ovf}$ = 1)

Cin = Cin$_{ovf}$ OR cpa$_4$ rLsb$_1$ = rLsb$_{ovf}$ rLsb$_0$ = 0

| Pseudo Compare | Mantissa Compare | Result Sign |
|---|---|---|
| $e_a > e_b$ | X | Sign a |
| $e_a < e_b$ | X | ! Sign b |
| $e_a = e_b$ | $m_a < m_b$ | ! Sign b |
| $e_a = e_b$ | $m_a > m_b$ | Sign a |

| LSB | Exact Result | Result Sign | Rounding Mode | Result Chosen |
|---|---|---|---|---|
| X | 1 | + | X | S1 |
| X | 1 | – | X | !S0 |
| X | 0 | X | Towards Zero | S0 |
| X | 0 | – | Towards + ∞ | S0 |
| X | 0 | + | Towards + ∞ | S1 |
| X | 0 | – | Towards – ∞ | S1 |
| X | 0 | + | Towards – ∞ | S0 |
| 0 | 0 | X | Towards Nearest (Even) | S0 |
| 1 | 0 | X | Towards Nearest (Even) | S1 |

X: Do not care
LSB: Least significant bit of S0

FLOATING POINT ARITHMETIC LOGIC UNIT ROUNDING USING AT LEAST ONE LEAST SIGNIFICANT BIT

FIELD OF THE INVENTION

The present invention relates to performing digital data processing and in particular to digital data processing using a floating point unit in an arithmetic logic unit.

BACKGROUND

As is well-known in the art, arithmetic logic units often perform data processing in a floating point format. Floating point units can be used to perform high precision arithmetic calculations on real, integer, and BCD integers. Moreover, floating point units can be used to perform conversion of numbers between floating point and integer formats.

According to IEEE standard 754, floating point numbers are divided into three sections or fields: a sign field, an exponent field, and a significand or mantissa field. Each field has a finite number of bits, e.g., a mantissa field in an extended precision format has 64 bits. During arithmetic operations that produce a result with a number of bits greater than the number of bits in the field, it is necessary to round the result to fit within the field.

Conventionally, in a floating point unit addition and subtraction operations are performed serially with the rounding operation. Typically, the mantissa of the operands are first normalized, a carry propagate add derives an unrounded result, and a rounding unit inspects the unrounded result and other bits, such as the sticky bit and rounding bit, to determine if it is necessary to round up or round down to obtain the final result. The unrounded result from the carry propagate adder is then incremented if the rounding unit indicates that is necessary. Each of the operations performed by the floating point unit to obtain the final result requires a finite amount of time. Because the steps are performed serially, the process is slow. Moreover, the use of a carry propagate adder is costly because it requires a large amount of area on the chip.

Thus, there is need for a floating point unit that performs arithmetic operations, such as addition and subtraction, in a non-serial manner to obtain a final result in an efficient manner. Further, there is a need for a floating point unit that performs arithmetic operations while avoiding the use of a carry propagate adder.

SUMMARY

A floating point unit includes an adding unit, such as a half adding unit, that generates a sum of a first mantissa and a second mantissa. Where a half adding unit is used a carry is generated along with the sum. At least one least significant bit from the sum and the carry is separated and received by a rounding unit. Where an addition operation is being performed, two least significant bits from the sum and the carry are removed and received by the rounding unit. The rounding unit uses the least significant bits of the sum and carry, along with a sticky bit, rounding bit and the predicted sign of the result to generate a carry in bit and rounded at least one least significant bit.

In a parallel path, the sum and carry are each formatted if a subtraction operation is being performed, and the result of the sum and carry is tested to see if an overflow condition exists. The sum and carry are then summed in an additional adding unit to produce an unincremented sum and an incremented sum, which are placed in a multiplexer. The carry in bit is used to select one of the unincremented sum and incremented sum. The rounded at least one least significant bit is then united with the selected unincremented sum or incremented sum.

By using parallel paths for these operations it is possible to test for overflow and format the sum and carry for subtraction while concurrently determining the rounding of the result. Consequently, an arithmetic operation may be performed without unduly slowing the processing of the result.

BRIEF DESCRIPTION OF THE DRAWINGS

The above and other features, aspects, and advantages of the present invention will become better understood with regard to the following description, appended claims, and accompanying figures, where:

FIG. 4 is a table showing the generation of the result sign for the operation unit shown in FIG. 3;

FIG. 5 shows five bits in mantissa A and mantissa B and a five bit sum and five bit carry, where the most significant bit is the carry out;

DETAILED DESCRIPTION

Figure 1:
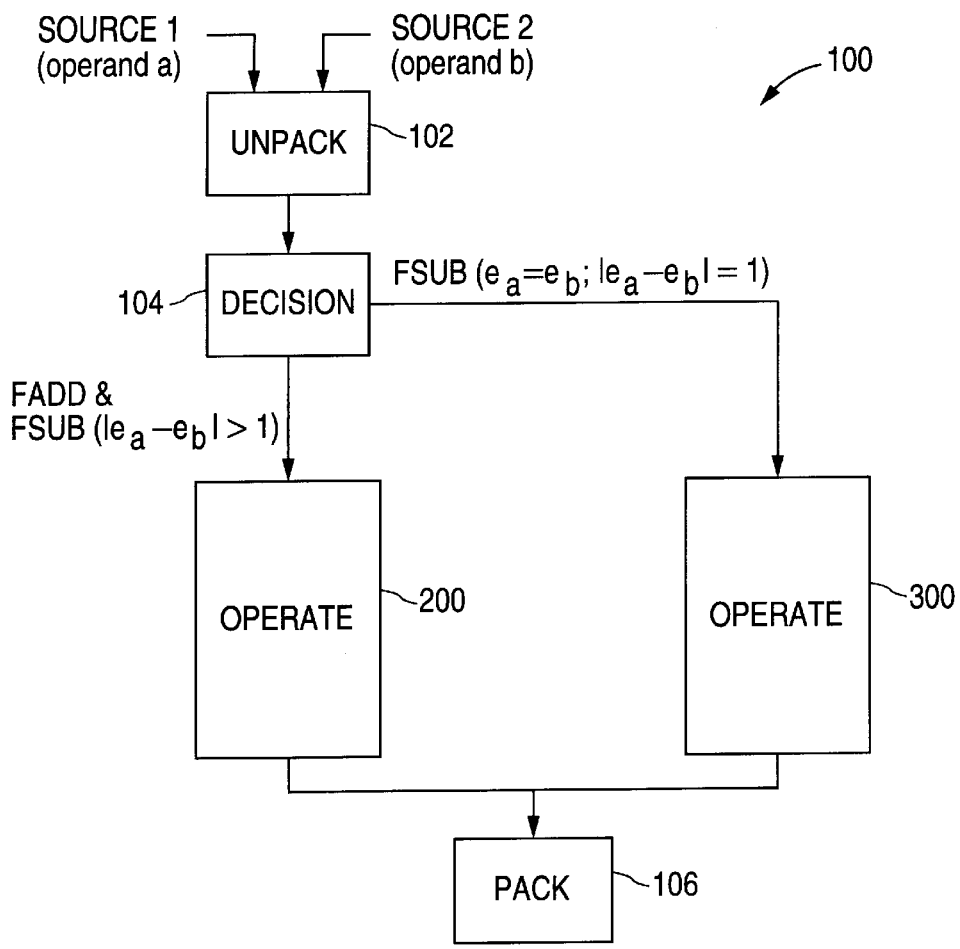
FIG. 1 is a basic diagram of a floating point unit that performs floating point addition FADD and subtraction FSUB operations.

FIG. 1 is a basic diagram of a floating point unit 100 that is part of an arithmetic logic unit. Floating point unit 100 performs floating point addition, i.e., FADD, and subtraction, i.e., FSUB, operations, as well as deflation and conversion from fixed point format to floating point format and floating point format to fixed point format.

As shown in FIG. 1, floating point unit 100 includes an unpack stage 102 in which data necessary for operation of floating point unit 100, such as operands from source 1 (operand a) and source 2 (operand b), operation code, precision, and destination address. The operands from source 1 and source 2 are unpacked into sign, exponent, and mantissa fields.

At the decision stage 104 a decision to follow the pipeline flowing through operation unit 200 or the pipeline flowing through operation unit 300 is made based on the particular operation to be performed by floating point unit 100 and the values of the exponents from the two operands. Floating point unit 100 utilizes operation unit 200 when performing addition or when performing subtraction when the absolute value of the difference between the exponent in operand a and the exponent in operand b is greater than one, i.e., $|e_a - e_b| > 1$.

Operation unit 300 is used when floating point unit 100 is executing subtraction and the absolute difference between the exponents of the two operands is less than or equal to one. In addition, operation unit 300 is used to convert an operand from fixed point format to floating point format or to deflate an operand between differing precisions, while operation unit 200 is used in converting an operand from floating point format to fixed point format.

When a result is obtained by either operation unit 200 or operation unit 300, the mantissa, along with the sign and exponent are packed at packing unit 106.

Figure 2A:
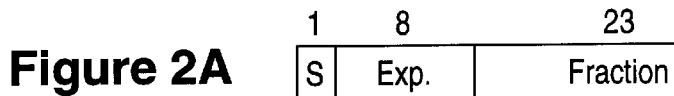
FIGS. 2A, 2B, and 2C show the IEEE-754 standard single precision, double precision and extended precision formats, respectively.
Figure 2B:
Figure 2C:

The working precision of floating point unit may be the IEEE-754 standard single precision, double precision or extended precision formats, as shown in FIGS. 2A, 2B, and 2C. FIG. 2A shows a single precision format that includes one sign bit, eight exponent bits, and twenty-three fraction or mantissa bits. The double precision format shown in FIG. 2B, includes one sign bit, eleven exponent bits, and fifty-two fraction or mantissa bits. The extended precision format shown in FIG. 2C has one sign bit, fifteen exponent bits, and sixty-four fraction or mantissa bits. The present disclosure describes floating point unit 100 as using the extended precision format, as shown in FIG. 2C, but it should be understood that alternative formats, including, but not limited to single precision and double precision formats may be also be used with floating point unit 100.

Figure 3A:
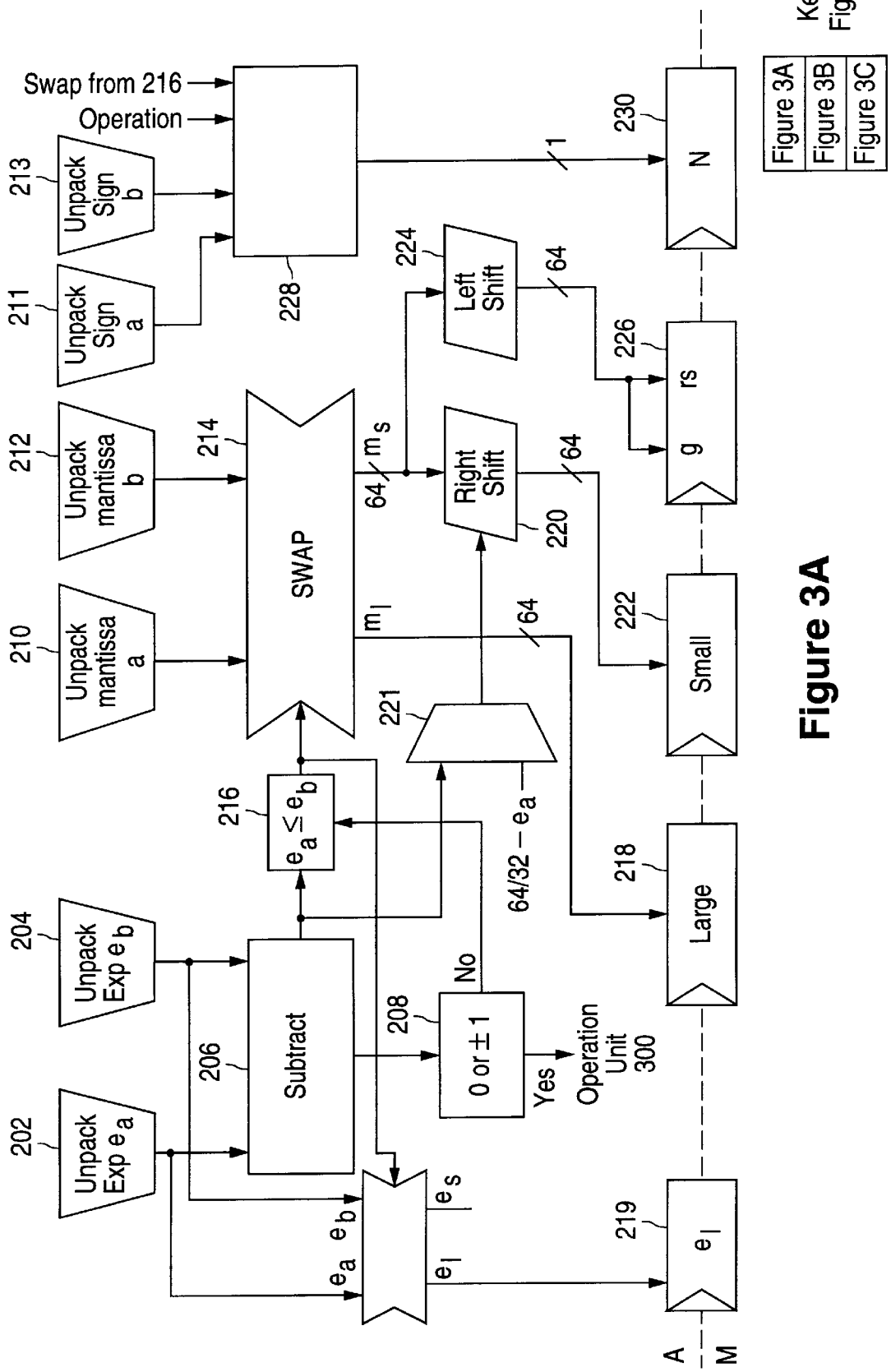
FIG. 3 is a schematic diagram of the construction of the operation unit for addition and subtraction, where the absolute difference between the exponents is greater than one.
Figure 3B:
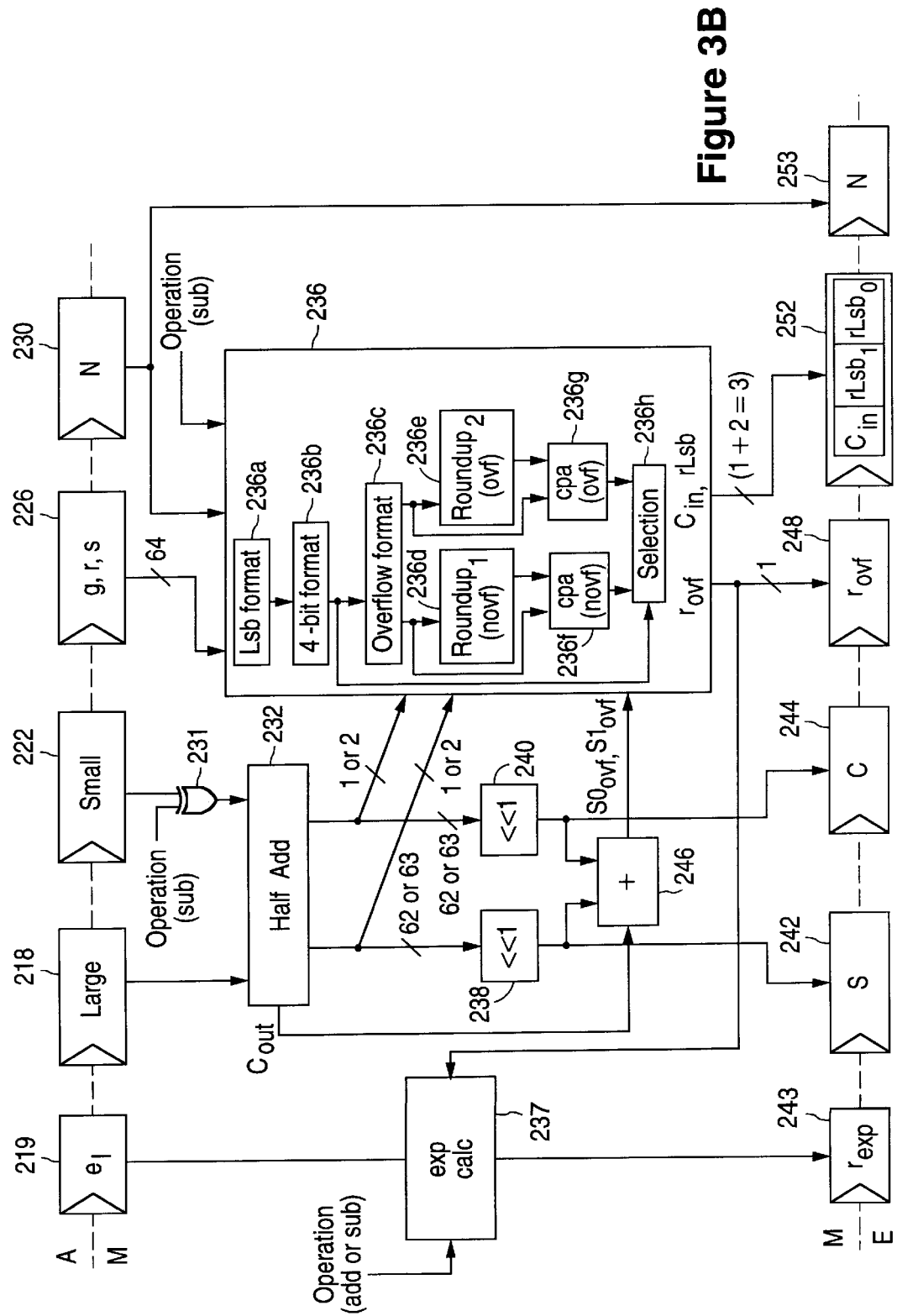
Figure 3C:
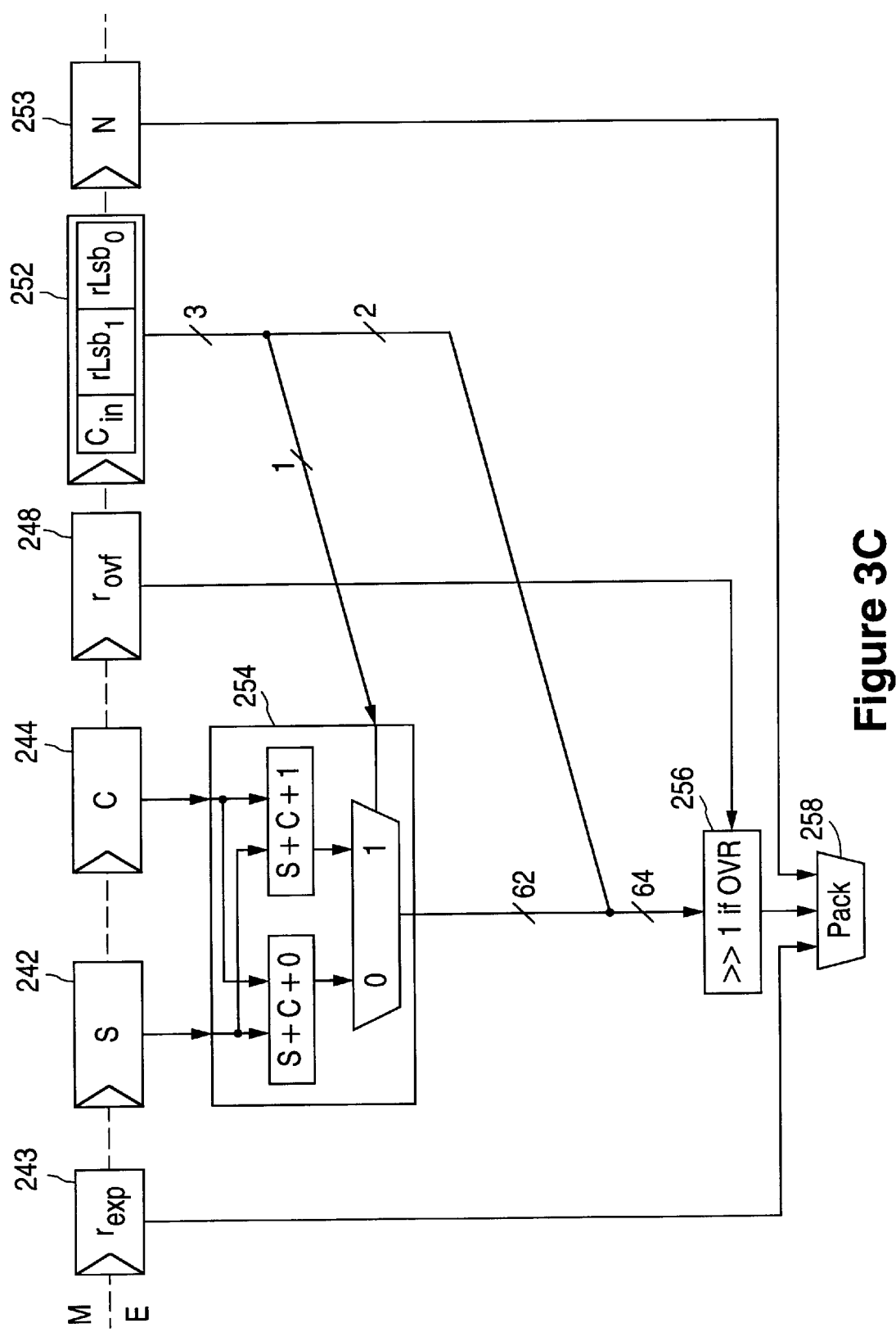

FIG. 3 is a schematic diagram of the construction of floating point unit 100 using operation unit 200. Operation unit 100 is divided into three stages, labeled stage A, stage M, and stage E.

Figure 7A:
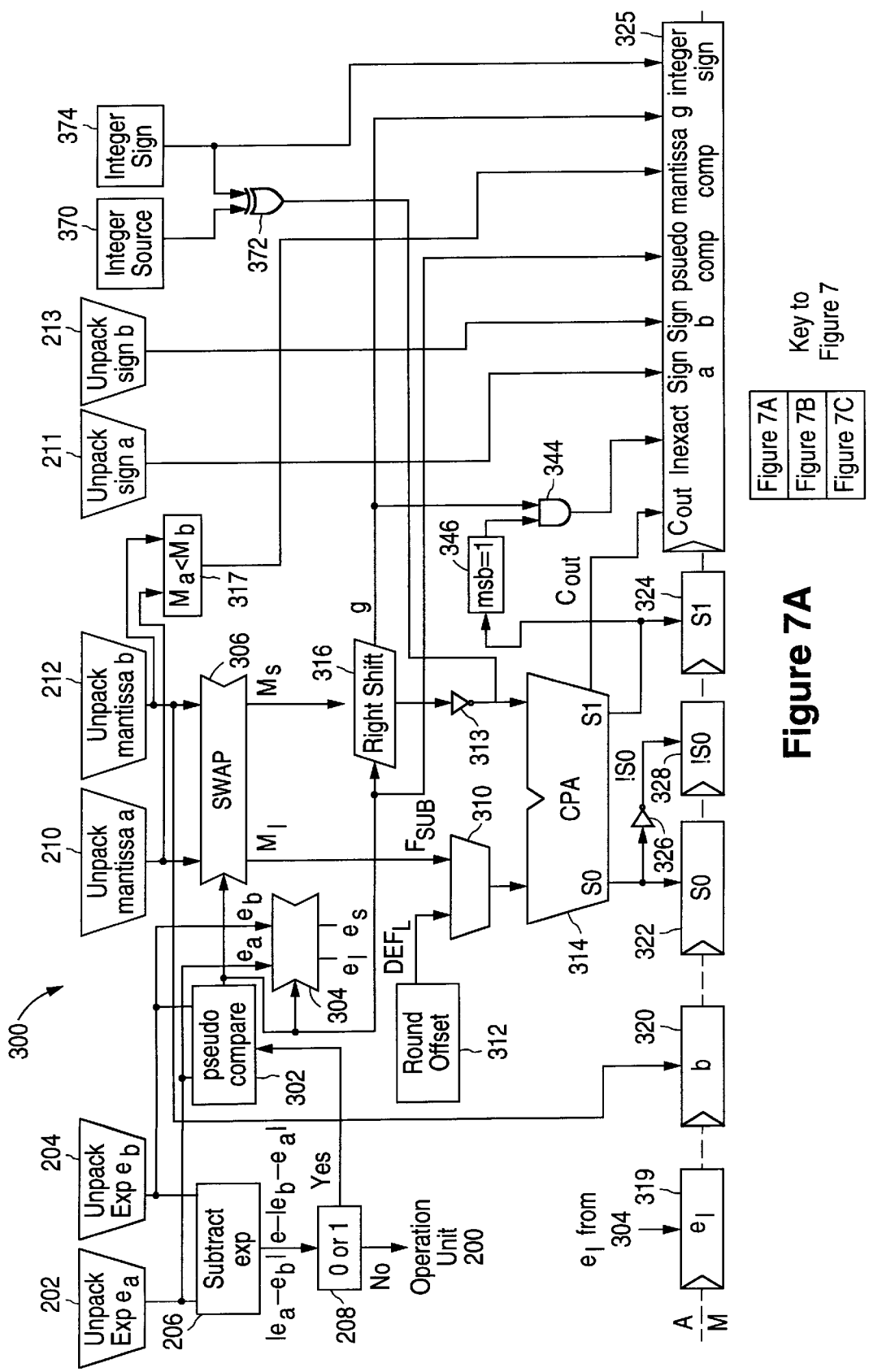
FIG. 7 is a schematic diagrams of the construction of the operation unit for subtraction, where the absolute difference between the exponents is less than or equal to one.
Figure 7B:
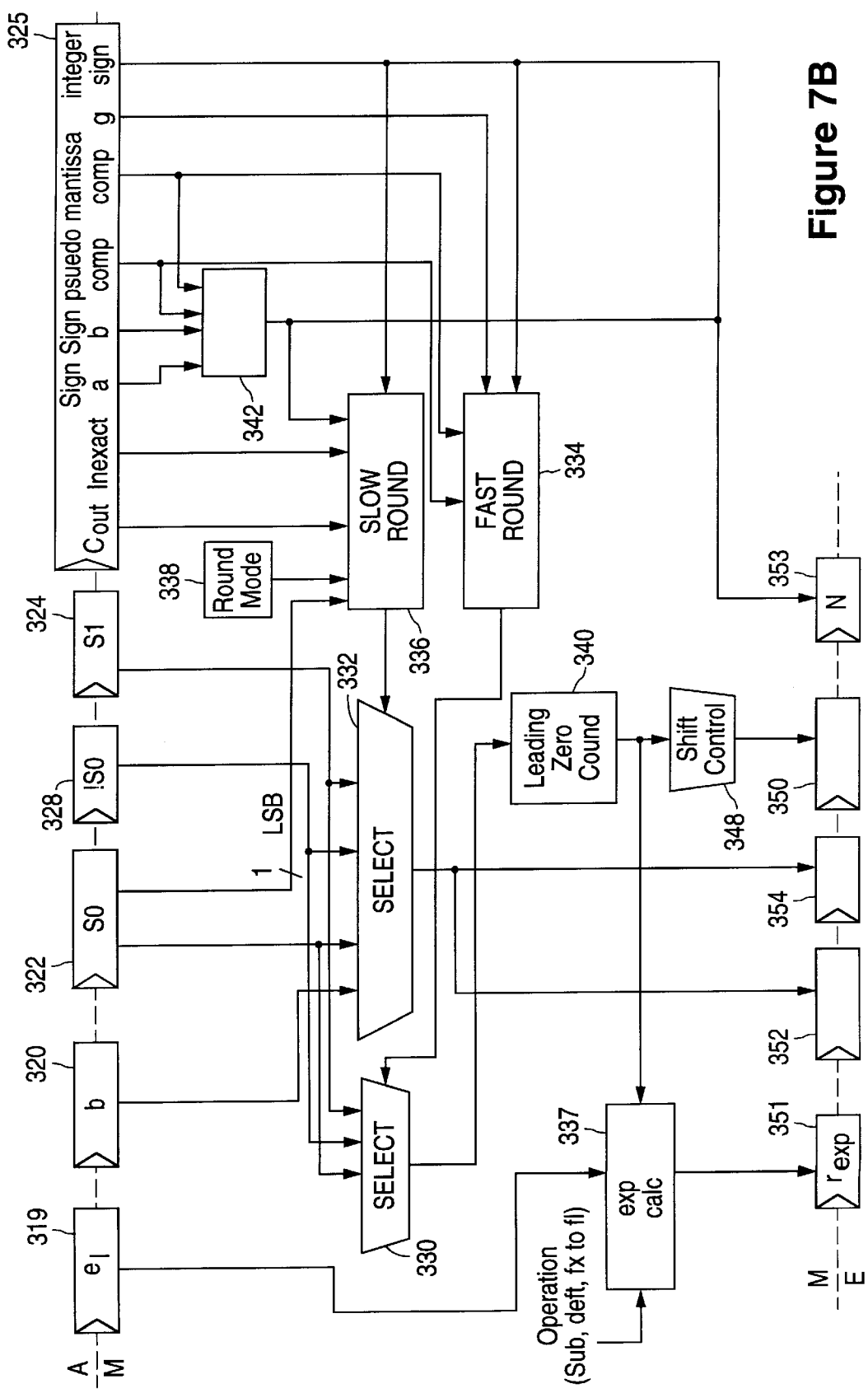
Figures 7C, 8, 9:
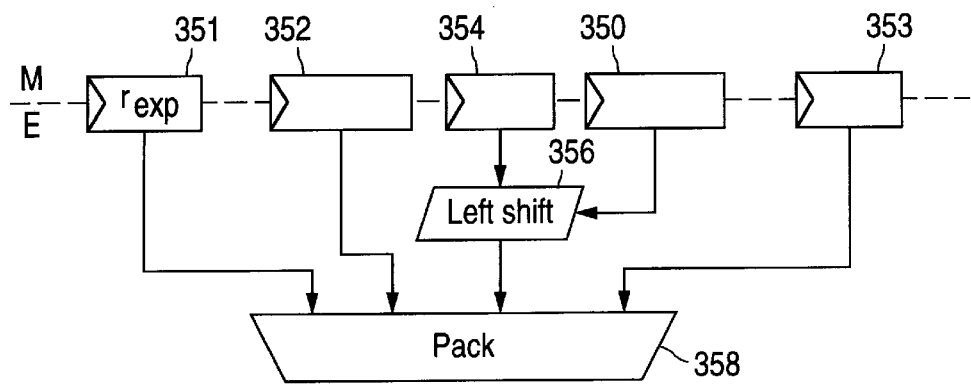
FIG. 8 is a table showing the generation of the result sign for the operation unit shown in FIG. 7.
FIG. 9 is a table illustrating the result chosen by the rounding circuits in the operation unit shown in FIG. 7.

As shown in FIG. 3, in stage A the sets of data in the form of the exponents of operands a and b are unpacked at unpack units 202 and 204. The exponents are then subtracted at subtraction unit 206. If a subtraction operation is to be performed by floating point unit 100, and the absolute difference between the exponents is less than or equal to one, i.e., 0 or 1, as shown in decision unit 208, floating point unit 100 uses operating unit 300 as illustrated in FIG. 7. However, where an addition operation is to be performed or where the absolute difference between the exponents is greater than one, operation unit 200, as shown in FIG. 3, is used.

The sets of data in the form of mantissas of operands a and b are unpacked in unpack units 210 and 212. Assuming that the extended precision format is used, the mantissas unpacked in unpack units 210 and 212 will each be sixty-four bits. A comparison unit 216 compares the values of the exponents for operand a ($e_a$) and operand b ($e_b$). A swapping unit 214 receives the result of the comparison between the exponents $e_a$ and $e_b$ from comparison unit 216 as well as the mantissas from unpack units 210 and 212. Swapping unit 214 swaps the position of the mantissas, when necessary, so that the mantissa of the larger operand is produced on data path $m_l$ and is stored in register 218, and the mantissa of the smaller operands is produced on data path $m_s$. Thus, swapping unit 214 swaps the mantissas as a function of the exponents.

The exponent $e_a$ of operand a and the exponent $e_b$ of operand b are placed in a swapping unit 215, which also receives the result of the comparison between the exponents $e_a$ and $e_b$ from comparison unit 216. Swapping unit 215 produces the larger of the exponents on data path $e_l$ and the smaller exponent on data path $e_s$. The larger of the exponents on data path $e_l$ is then stored in register 219.

The 64 bit mantissa of the larger operand is placed in register 218 between stages A and M. For ease of reference, it will be assumed that operand a is the larger of the two operands, and therefore the mantissa of operand a is produced at $m_l$ and stored in register 218. The 64 bit mantissa of the smaller of the operands, e.g., operand b, is denormalized at shifting unit 220 by shifting the bits in the mantissa to the right by the difference between $e_a$ and $e_b$, thereby aligning the mantissas of operands a and b. Thus, the right shifting of the mantissa is actually driven by the difference between the exponents of the operands. For example, if operand a has an exponent of ten and operand b has an exponent of six, the mantissa of operand b will be right shifted by four bits. The right shifted mantissa of operand b is then placed in register 222 between stage A and M.

Because the mantissa of operand b was shifted to the right to align the mantissas, the least significant bits from mantissa b are shifted out and lost. Thus, for example, where mantissa b is shifted to the right by four bits, there will be four least significant bits of mantissa b that are lost. These shifted out bits, however, may be necessary for proper rounding of the result. Consequently, the mantissa of the smaller operand, e.g., mantissa b, is also left shifted at shifting unit 224 by an amount equal to 64 minus the right shift amount, where 64 is the bits in the mantissa. The result is then stored in register 226 between stages A and M. Thus, if mantissa b is right shifted by shifting unit 220 by four places, shifting unit 224 will left shift mantissa b by sixty places to obtain the bits that were shifted out by shifting unit 220. Register 226 stores the specific bits that were shifted out of the mantissa of the smaller operand by right shift unit 220.

In addition, within stage A the result sign (N) of the floating point operation on operands a and b is determined in block 228. Block 228 receives the sign of operand a from unpack unit 211, the sign of operand b from unpack unit 213, the operation being performed (addition or subtraction), and whether a swapping operation was performed at swapping unit 214, i.e., the output of comparison unit 216 indicating whether operand a is greater than operand b. Block 228 generates the result sign in accordance with the table shown in FIG. 4. As can be seen in FIG. 4, the absolute operations being performed can be expressed as either |a|+|b| or |a|−|b|. However, as indicated in FIG. 4, for the operations that can be expressed as |a|−|b|, the result sign (N) is dependent on whether operand a is greater than operand b. The result sign N of the operation is then stored in register 230 between stages A and M.

The mantissa of the larger operand stored in register 218, e.g., mantissa a, and the mantissa of the smaller operand, e.g., mantissa b, stored in register 222 are provided to the half add unit 232 within stage M, as shown in FIG. 3. An inverting logic gate in the form of exclusive OR logic unit 231 is disposed in the data path between register 222 and half add unit 232. Exclusive OR logic unit 231 also receives the operation being performed by floating point unit 100, where a subtraction operation causes exclusive OR unit 231 to invert the bits of the mantissa of the smaller operand. The mantissa of the smaller operand is inverted because the subtraction operation is the same as addition of the larger operand with the conjugate of the smaller operand plus 1, i.e., (a−b)=(a+b̄+1).

Half add unit 232 uses the first bit from both operand a, i.e., $a_0$, and operand b, i.e., $b_0$, and generates a sum $S_0$ and a carry $C_1$. Half add unit 232 then uses the second bit from operands a and b, i.e., $a_1$ and $b_1$, and generates the sum $S_1$ and carry $C_2$. Thus, half add unit 232 takes the first bits from the 64 bit mantissas of operands a and b and generates a 64 bit sum on the data path labeled S and a 64 bit carry on the data path labeled C. FIG. 5, by way of an example, shows five bits in mantissa A and mantissa B labeled $A_0$ through $A_4$ and $B_0$ through $B_4$, respectively. As shown in FIG. 5, a five bit sum, with bits $S_0$ through $S_4$, is generated, as is a five bit carry. However, as shown in FIG. 5, the most significant bit of the carry is the carry out "$C_{OUT}$," and the least significant bit $C_0$ is always zero. Of course, where an extended precision format is used, there would be sixty-four bits in mantissa A and mantissa B, as well as in the sum and carry, with the most significant bit of carry being the carry out $C_{OUT}$. The carry out $C_{OUT}$ bit is separated from the remaining carry bits. Thus, for an extended precision format, half add unit 232 produces a 64 bit sum on data path S and a 64 bit carry on data path C, including the least significant bit $C_0$, which is always zero.

In the case of addition operations, the two least significant bits from the 64 bit sum and the 64 bit carry are separated and are received by the rounding unit 236. In the case of subtraction operations, the least significant bit from the 64 bit sum and the 64 bit carry is separated and is received by the rounding unit 236. The remaining 62 or 63 bits of the sum and carry, from the addition operation and subtraction operation, respectively, are provided to the format units 238 and 240, respectively, During subtraction operations, format units 238 and 240 left shift both the sum and carry by one position. This is required so that the number of bits produced by the subtraction of the sum and carry is the same number of bits produced by the addition of the sum and carry. For example, the subtraction of two 4 bit binary numbers can be either 3 or 4 bits, while the addition of two 4 bit binary numbers can be either 4 or 5 bits. By "pre-shifting" the two 4 bit binary numbers prior to performing the subtraction operation, the difference will now be 4 or 5 bits. Thus, both addition and subtraction will have the same range of possible bits, thereby simplifying normalization. Of course, if floating point unit 100 is performing an addition operation, format units 238 and 240 do not shift the sum and carry bits.

The sum bits from the format unit 238 is stored in register 242 between stages M and E, and likewise, the carry bits from format unit 240 are stored in register 244 between stages M and E. In addition, the sum and carry bits from the respective format units 238 and 242 are received by a summing unit 246, which is used as an overflow detection unit. Summing unit 246 also receives the carry out $C_{OUT}$ bit from half add unit 232. Unit 246 determines if the addition of the sum and carry bits will overflow prior to or after a rounding increment. Designating the ungrounded sum as S0 and the post-rounded (or incremented by one) sum as S1, unit 246 determines if either of S0 or S1 will overflow. The two separate overflow results for the S0 and S1 sums are received by the rounding unit 236. Rounding unit 236 processes the two separate overflow results further and produces the final overflow status bit $r_{ovf}$ and stores it in register 248 between stages M and E.

Because unit 246 takes a significant amount of time to calculate the overflow status, two rounding calculations are performed in parallel by rounding unit 236. One rounding calculation assumes that the eventual rounded result will not overflow and the other rounding calculation assumes that the rounded result will overflow. Thus, when unit 246 finishes its calculation of the overflow status, and supplies the result to rounding unit 236, the result can be selected from the two rounding calculations already performed.

Figure 6A:
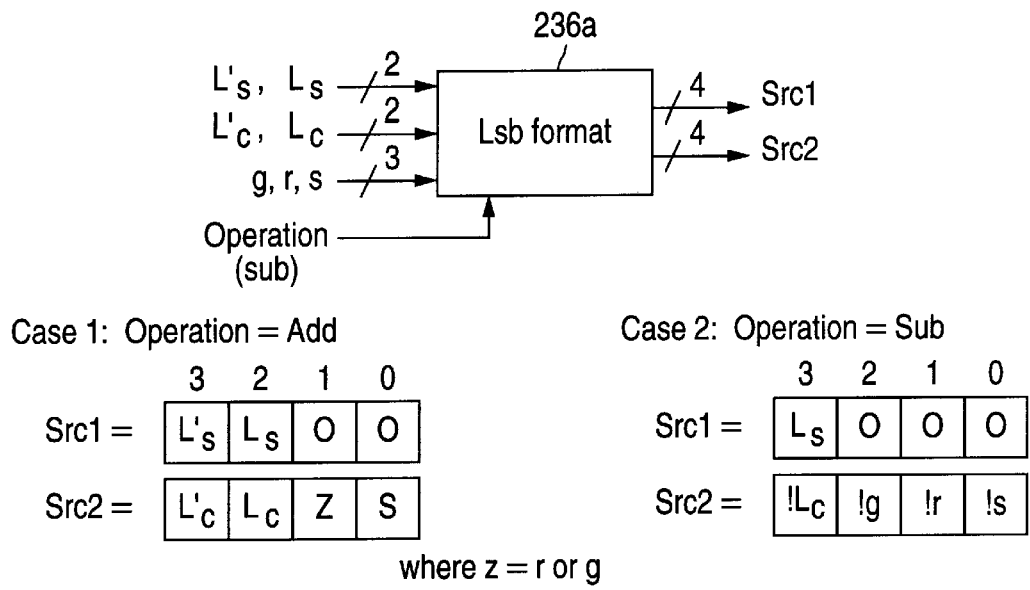
FIGS. 6A through 6F are schematic diagrams and tables showing the operation of the rounding unit shown in FIG. 3.

FIGS. 6A through 6F are schematic diagrams and tables showing the operation of rounding unit 236. FIG. 6A shows a LSB format unit 236a that receives the one or two least significant bits from the 64 bit sum ($L_s'$, $L_s$) and the 64 bit carry ($L_c'$, $L_c$). LSB format unit 236a also receives a guard bit ("g bit"), round bit ("r bit"), and sticky bit ("s bit") from register 226, as well the operation (subtraction or addition) being performed by the floating point unit. The g bit is the most significant bit held in register 226, i.e., the most significant bit that was shifted out by right shift unit 220. The r bit is the second most significant bit held in register 226. The s bit represents the cumulative OR of the remaining 62 bits held in register 226. Rounding unit 236 actually receives and OR's all the bits, other than the g and r bits, held in register 226, to generate the s bit. Alternatively, the OR function may be performed between register 226 and rounding unit 236 so that LSB format unit 236a receives only one s bit. As shown in FIG. 6A, LSB format unit 236a produces two result sources, src1 and src2, each having four bits. The values for sources src1 and src2 produced by LSB format unit 236a depends on the type of operation being performed by the floating point unit, as indicated in the tables designated as "Case 1: Operation=Add" and "Case 2: Operation=Sub," where z equals the r bit logically OR'd with the g bit, and !x equals the negated or logical NOT of the x bit, x being any bit.

Figure 6B:
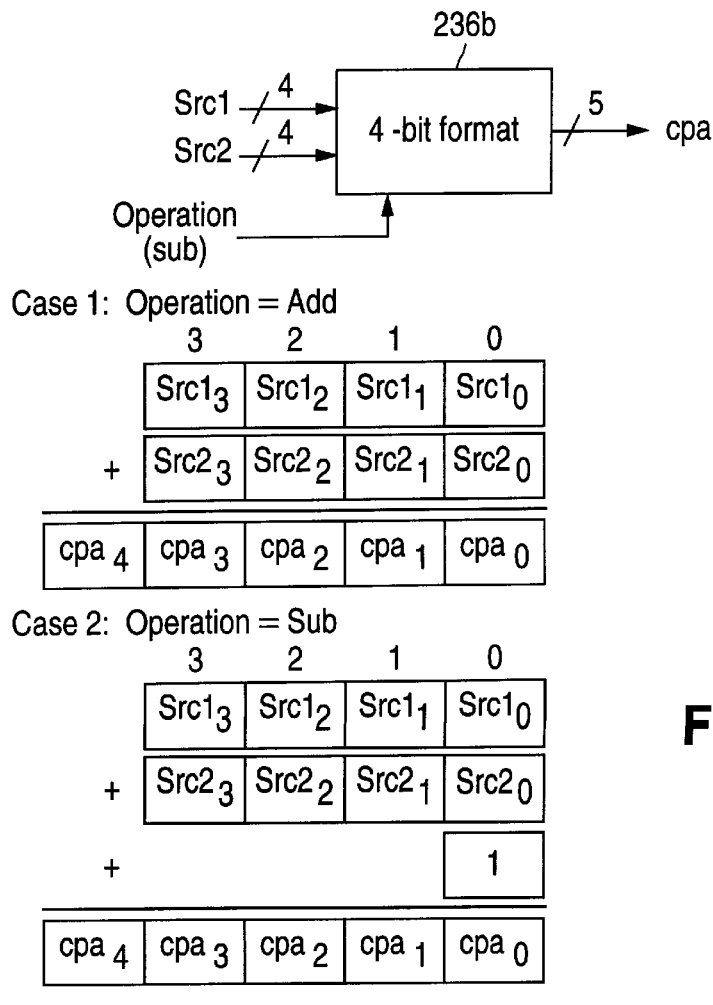

FIG. 6B shows a 4-bit format unit 236b, which receives sources src1 and src2, as well as the operation being performed, and produces a five bit CPA result. The value of the five bit CPA result again depends on the type of operation being performed by the floating point unit, as indicated in the tables designated as "Case 1: Operation=Add" and "Case 2: Operation=Sub" shown in FIG. 6B.

Figure 6C:
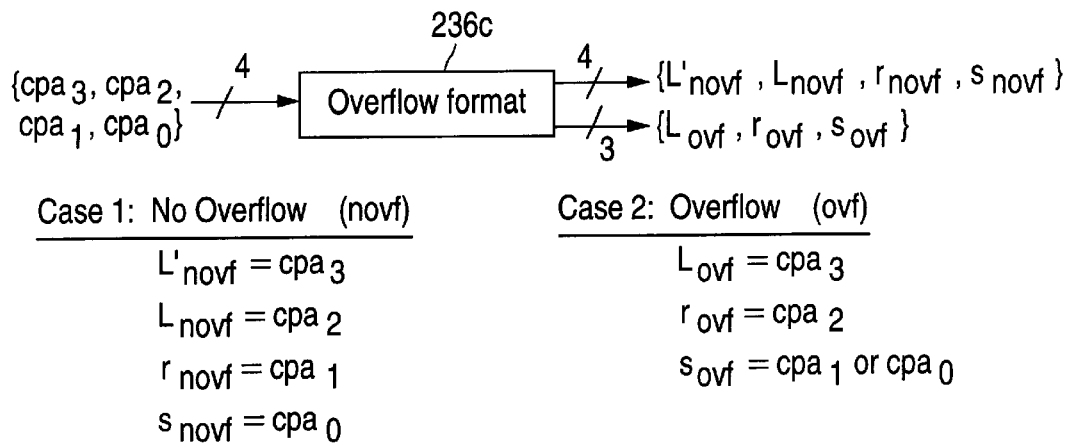

FIG. 6C is an overflow format unit 236c. Overflow format unit 236c receives the four least significant bits of the five bit CPA result, i.e., $cpa_3$, $cpa_2$, $cpa_1$, and $cpa_0$, produced by 4-bit format unit 236b. Overflow format unit 236c then produces two results: a no overflow case and an overflow case. As indicated by the table designated as "Case 1: No Overflow (novf)" in FIG. 6C, overflow format unit 236c produces four bits $L'_{novf}$, $L_{novf}$, $r_{novf}$, $s_{novf}$ for the no overflow case, with respective values of $cpa_3$, $cpa_2$, $cpa_1$, and $cpa_0$. Only three bits $L_{ovf}$, $r_{ovf}$, $s_{ovf}$ having respective values of $cpa_3$, $cpa_2$, and $cpa_1$ logically OR'd with $cpa_0$, are produced by overflow format unit 236c for the overflow case, as shown in the table designated "Case 2: Overflow (ovf)" in FIG. 6C.

Figure 6D:
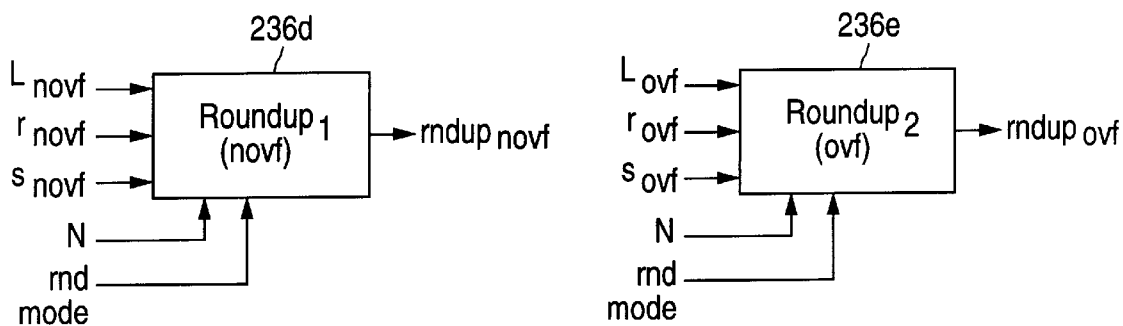

A roundup$_1$ unit 236d for the no overflow (novf) case and a roundup$_2$ unit 236e for the overflow (ovf) case are shown in FIG. 6D. Roundup$_1$ unit 236d receives $L_{novf}$, $r_{novf}$, $s_{novf}$, the result sign N from register 230, and the rounding mode, and produces a round up bit ($rndup_{novf}$). The particular rounding mode used may be chosen by the user. Roundup$_2$ unit 236e receives $L_{ovf}$, $r_{ovf}$, $s_{ovf}$, the result sign N from register 230 and the rounding mode and also produces a round up bit ($rndup_{ovf}$). The table shown in FIG. 6D illustrates how the round up bit is chosen for both roundup$_1$ unit 236d and roundup$_2$ unit 236e.

Figure 6E:
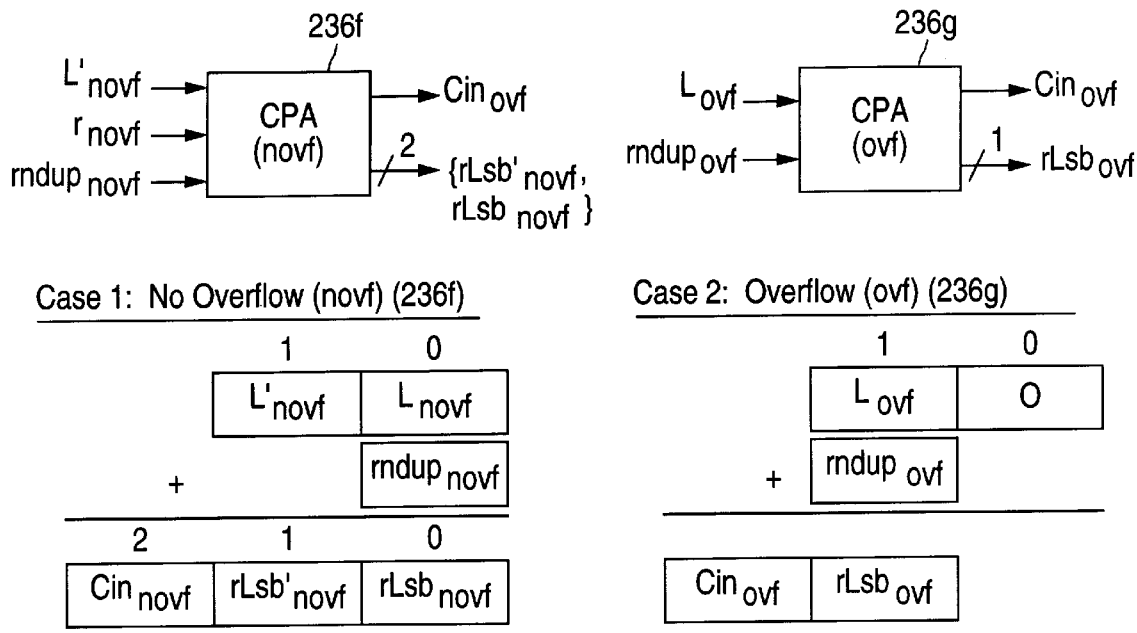

FIG. 6E shows two parallel CPA units 236f and 236g for the no overflow (novf) and overflow (ovf) cases respectively. CPA unit 236f for the no overflow case receives $L'_{novf}$ and $L_{novf}$ from overflow format unit 236c and $rndup_{novf}$ from roundup$_1$ unit 236d and produces a carry in bit $Cin_{ovf}$ and two rounded least significant bits $rlsb'_{novf}$ and $rlsb_{novf}$. CPA unit 236g for the overflow case receives $L_{ovf}$ from overflow format unit 236c and $rndup_{ovf}$ from roundup$_2$ unit 236e, and produces a carry in bit $Cin_{ovf}$ and a single rounded least significant bit $rlsb_{ovf}$. The table designated "Case 1: No Overflow (novf)" shown in FIG. 6E shows the resultant values for CPA unit 236f, and the table designated "Case 2: Overflow (ovf)" shows the resultant values for CPA unit 236g.

Figure 6F:
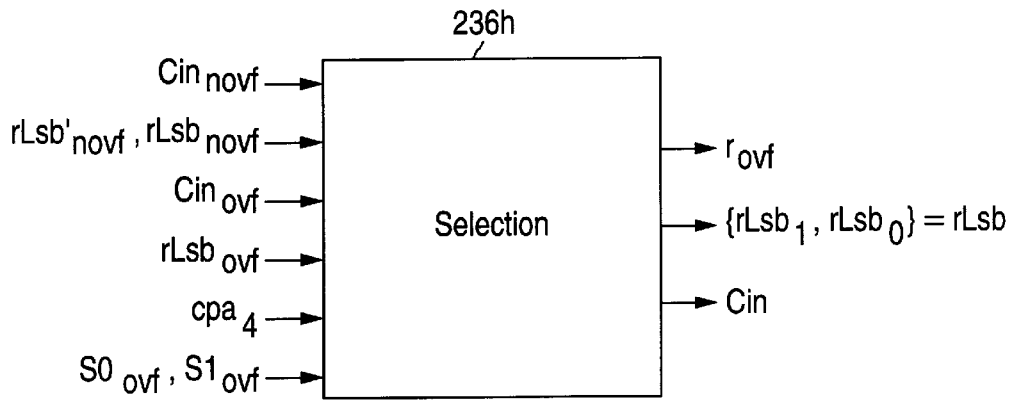

FIG. 6F shows the selection unit 236h, which produces the final overflow status bit $r_{ovf}$, which is stored in register 248, and a carry in bit Cin and the rounded least significant bits $rlsb_1$ and $rlsb_0$, which are stored in register 252 between stages M and E. Selection unit 236h receives $Cin_{novf}$, $rlsb'_{novf}$, and $rlsb_{novf}$ from CPA unit 236f and $Cin_{ovf}$, $rlsb_{ovf}$ from CPA unit 236g. Selection unit 236h also receives the most significant bit from the five bit CPA result, i.e., $cpa_4$, produced by 4-bit format unit 236b. In addition, selection unit 236h receives the two separate overflow results from unit 246, i.e., the un-rounded sum S0 and the post-rounded (or incremented by one) sum S1. As shown in FIG. 6F, the final overflow status bit $r_{ovf}$ is determined by logically OR'ing $Cin_{novf}$ with $cpa_4$, AND'ing the result with $S1_{ovf}$ and OR'ing that result with $S0_{ovf}$. The table designated "Case 1: No Overflow" shown in FIG. 6F shows the values of Cin, $rlsb_1$, and $rlsb_0$ where the final overflow status bit $r_{ovf}$ is equal to zero. When overflow status bit $r_{ovf}$ is equal to one, the values of Cin, $rlsb_1$, and $rlsb_0$ are indicated in the table designated "Case 2: Overflow," shown in FIG. 6F.

The larger exponent $e_l$ stored in register 219 is received by exponent calculation unit 237 along with the operation being performed, i.e., addition or subtraction, and the final overflow status bit $r_{ovf}$ from rounding unit 236. When the operation being performed is addition, exponent calculation unit 237 produces a result exponent $r_{exp}$ that is: (1) the larger exponent $e_l$ if the overflow status bit $r_{ovf}$ is equal to zero, i.e., there is no overflow; or (2) the larger exponent $e_l$ minus one if the overflow status bit $r_{ovf}$ is equal to one, i.e., there is overflow. When the operation being performed is subtraction, exponent calculation unit 237 produces a result exponent $r_{exp}$ that is: (1) the larger exponent $e_l$ minus one if the overflow status bit $r_{ovf}$ is equal to zero, i.e., there is no overflow; or (2) the larger exponent $e_l$ if the overflow status bit $r_{ovf}$ is equal to one, i.e., there is overflow. The resulting exponent $r_{exp}$ from exponent calculation unit 237 is then placed in register 243.

The result sign N from register 230 is placed in register 253 between stages M and E.

As shown in FIG. 3, in stage E, the sum from register 242 and the carry from register 244 are received by another summing unit 254. As illustrated in FIG. 3, summing unit 254 produces includes an incremented adding unit and thus produces two sums, one is equivalent to the unincremented sum s+c, and the other is equivalent to the incremented sum s+c+1. The unincremented sum and incremented sum are placed in a multiplexer and then one of the two sums is then chosen according to whether the carry in bit Cin stored in register 252 is a one or a zero. Thus, for example, if the carry in bit Cin stored in register 252 is a one, the sum of s+c must be increased by one and consequently, the sum s+c+1 is chosen. Summing unit 254 generates a 62 bit sum, to which the rounded least significant bits $rlsb_1$ and $rlsb_0$ stored in register 252 are united, thereby generating a 64 bit total received by formatting unit 256.

Because format units 238 and 240 are used to left shift the sum and carry by one position if a subtraction operation is being performed, the range of possible bits in the final result from summing unit 254 is the same for a subtraction operation and an addition operation. The design of formatting unit 256 is consequently simplified because formatting unit 256 is not concerned with whether the requested operation is addition or subtraction.

Formatting unit 256 receives the 64 bit total as well as carry out $C_{OUT}$ when there is an overflow. In an overflow condition, formatting unit 256 right shifts the 64 bit total and joins carry out $C_{OUT}$ as the most significant digit. The resulting mantissa from unit 256, resulting exponent $r_{exp}$ from register 243, and sign from register 253 are then packed into packing unit 258.

Operation unit 200 also supports conversion from floating point to fixed point. The mantissa of the floating point number to be converted is unpacked at unit 210. The mantissa is received by shifting unit 220. The mantissa is right shifted by a constant that is determined at unit 221. The constant depends on the whether the conversion is going from single precision to 32 bit fixed point, or from double or extended precision to 64 bit fixed point. The constant is equal to the unbiased exponent of the number which is unpacked at unpack unit 202, subtracted from 64 or 32, depending on the bit size of the desired fixed point format. Thus, where the unbiased exponent of the number unpacked at unpack unit 202 is 64, no right shifting is necessary. If the unbiased exponent, however, is less than the desired bit size of the fixed point format, the mantissa is right shifted by the difference. Where a negative number is converted from floating point to fixed point, the number is also negated using the exclusive OR logic unit 231, half add unit 232, and adding unit 250. Where significant bits are shifted out by shifting unit 220, rounding unit 236 performs the rounding operation as described above.

As shown in FIG. 7, operation unit 300 is enabled by decision unit 208 where floating point unit 100 is performing a subtraction operation and the absolute difference between the exponents of operand a and b is less than or equal to one, i.e., 0 or 1. FIG. 7 is a schematic diagrams of the construction of floating point unit 100, including operation unit 300 divided into three stages, labeled stage A, stage M, and stage E.

Operation unit 300 uses a pseudo compare unit 302 to compare the two least significant bits of exponent a and exponent b. Because operation unit 300 is used only when the exponents are equal or at most differ by one, only the two least significant bits need to be compared. The result of the pseudo compare is received by swapping unit 304, which also receives exponent $e_a$ and exponent $e_b$. Swapping unit 304 produces the larger exponent on data path $e_l$ and the smaller exponent on data path $e_s$. The larger exponent on data path $e_l$ is then stored in register 319.

The result of pseudo compare unit 302 is also received by swapping unit 306, which also receives mantissa a and mantissa b from unpack units 210 and 212. Swapping unit 306 swaps the position of the mantissas when pseudo compare unit 302 indicates that one exponent is larger than the other such that the mantissa of the larger of the operands is produced on data path $m_l$ and the mantissa of the smaller of the operands is produced on data path $m_s$. If the result of the pseudo compare unit 302 indicates that the two sources have equal exponents, we can arbitrarily designate one of the two operands as ms and the other as $m_l$.

The mantissa from operand b, which is unpacked at unpack unit 212, is also stored in register 320 in between stages A and M. Data stored in register 320 is used in the deflation operation described below. The mantissa $m_l$ from the larger operand is stored in register 310, which also receives a round offset bit from offset unit 312 to be used during deflation. During the subtraction operation, the mantissa $m_l$ for register 310 is received by a carry propagate adder 314.

The mantissa $m_s$ of the smaller operand is received by a shifting unit 316. Shifting unit 316 also receives the result from pseudo compare unit 302 indicating the difference between the exponents of operands a and b. Where the exponents are unequal, shifting 316 will right shift mantissa $m_s$ by one bit. Thus, the least significant bit is shifted out and becomes the guard bit ("g bit"). The mantissa $m_s$ produced by shifting unit 316, which may or may not be right shifted depending on the state of equality of the exponents of operands a and b, is received by carry propagate adder 314 via logical inverter 313.

Carry propagate adder 314 generates both a sum (S0) and an incremented sum (S1) that are stored in registers 322 and 324, respectively, between stages A and M. The sum S0 is also converted to a complemented sum (!S0) via inverter 326, which is then stored in register 328 between stages A and M. Assuming for the sake of clarity that operand A is the larger operand, the sum (S0) generated by carry propagate adder 314 is equivalent to mantissa A minus mantissa B minus one (a−b−1), while the complemented sum (!S0) is equivalent to mantissa B minus mantissa A (b−a), and the incremented sum (S1) is equivalent to mantissa A minus mantissa B (a−b).

The signs of operand a and operand b are unpacked at unpack units 211 and 213, respectively, and stored in register 325 between stages A and M.

The decision of which result to choose, i.e., S0, !S0, or S1, is made in stage M, shown in FIG. 7. The results that are stored in registers 322, 324, and 328 are received by two select units 330 and 332. The select units 330 and 332 are respectively controlled by a fast rounding unit 334 and a slow rounding unit 336. Fast rounding unit 334 receives the output of mantissa comparison unit 317, the g bit from shifting unit 316, and the result from pseudo compare unit 302, which are stored in a register 325 between stages A and M.

The three results, i.e., S0, !S0, and S1, in select unit 330 are chosen according to the following rules. Where the exponents of the operands are equal ($e_a=e_b$) and mantissa A is less than mantissa B, the incremented sum (S1) is chosen, and the result is exact, thus no rounding is necessary. Where the operands are equal ($e_a=e_b$) and mantissa A is not less than mantissa B, the result is still exact, but the complemented sum (!S0) is chosen. Where the exponents are not equal ($e_a \neq e_b$) and the g bit shifted out by shifting unit 316 is equal to zero, the incremented sum (S1) is chosen, which again will be exact. Where the exponents are not equal ($e_a \neq e_b$) and the g bit shifted out by shifting unit 316 is equal to one, the result chosen is the sum (S0), which may be exact or inexact depending on the presence of leading zeros. Where the g bit is equal to one and the most significant bit is a zero, the guard bit may be shifted in without losing any significant bits producing an exact result. However, where the most significant bit is a one, the g bit cannot be shifted in without losing significant bits. In this case, it may be necessary to round up to the incremented sum (S1) or to round down to the sum (S0). However, the fast rounding method is used to efficiently count the leading zeros of the result. Because there are no leading zeros in either the sum (S0) or the incremented sum (S1), sum (S0) can be used as the result.

The result that is chosen from select unit 330 by fast rounding unit 334 is received by leading zero count unit 340. The leading zero count unit 340 counts the number of leading zeros while the slow rounding unit 336 is choosing the correct or most correct result from select unit 332. Thus, the use of fast rounding unit 334 permits an approximate result to be chosen quickly so that the leading zero count can be executed while slow rounding unit 336 conducts the slower process of determining the correct result from select unit 332.

The number of leading zeros from leading zero count unit 340 are received by shift control unit 348. Shift control unit 348 controls the amount that the result will be left shifted. Shift control unit 348 directs the left shift of the result by the number of zeros. The signal from shift control unit 348 is stored in register 350 between stages M and E.

Slow rounding unit 336 receives the rounding mode selected by the user from unit 338 and the result sign N from block 342. Block 342 receives the output signal from pseudo compare unit 302, the output signal from mantissa compare unit 317, the sign of operand a and the sign of operand b, all of which are stored in register 325. Block 342 then produces a result sign N in accordance with the table shown in FIG. 8, where X indicates that it does not matter. The result sign N from block 342 is placed in register 353 between stages M and E.

Slow rounding unit 336 also receives any carry out $C_{OUT}$ bit, which is stored in register 325 between stages A and M, and the least significant bit from the unincremented sum (S0) stored in register 322. The carry out $C_{OUT}$ bit is referred to by slow rounding unit 336 to determine whether the result from carry propagate adder 314 is positive or negative. A carry out of "1" indicates a positive result and a carry out of "0" indicates a negative result. Moreover, slow rounding unit 336 receives an inexact signal from AND logic unit 344. AND logic unit 344 receives the g bit from shifting unit 316, as well as the most significant bit from the incremented sum (S1) via block 346 and stores the result in register 325. Where both the most significant bit and the g bit are ones, the result from carry propagate adder 314 is inexact, and thus rounding is necessary. Slow rounding unit 336 selects the incremented sum (S1) when the result is exact, as determined by AND logic unit 344, and the result is positive. When the result is exact and negative, however, slow rounding unit 336 selects the complemented sum (!S0). When the result is inexact, i.e., both the most significant bit and the g bit are ones, slow rounding unit 336 selects between the sum (S0) and the incremented sum (S1) according to the table shown in FIG. 9, where X indicates that it does not matter and LSB represents the least significant bit from the unincremented sum (S0) stored in register 322.

The result selected by slow rounding unit 336 from select unit 332 is stored in registers 352 and 354 between stages M and E.

For the sake of convenience, register 325 is shown as holding several individual data, including the carry out $C_{OUT}$ bit, the inexact result from AND logic unit 344, sign a, sign b, the result of pseudo comparison unit 302, the result of mantissa comparison unit 317, the g bit. It should be understood that register 325 between stage A and M can be divided into separate registers each storing individual data.

The larger exponent $e_l$ from register 319 is received by exponent calculation unit 337 along with the leading zero count from leading zero count unit 340 and the operation being performed, i.e., subtraction, deflation, or fixed point to floating point conversion. When the operation is subtraction, exponent calculation unit 337 produces a result exponent $r_{exp}$ that is the larger exponent $e_l$ minus the result of the leading zero count. The resulting exponent $r_{exp}$ from exponent calculation unit 337 is then placed in register 351.

As shown in FIG. 7, the result that is stored in register 354 is received by shifting unit 356 in stage E. Shifting unit 356 normalizes the result by left shifting the bits by the number of zeros counted by leading zero count unit 340 as directed by shift control unit 348. The normalized mantissa result from shifting unit 356 is then packed at packing unit 358 along with the resulting exponent $r_{exp}$ from register 351, and the sign from register 353 are then packed into packing unit 358.

Operation unit 300 can also be used to convert a number from fixed point to floating point. In converting from fixed point to floating point, an exponent needs to be created, which is accomplished using the leading zero count unit 340. The number to be converted obtained from integer source 370 is received by carry propagate adder 314 and is stored in register 322 between stages A and M. An inverting logic gate in the form of exclusive OR logic unit 372 is disposed in the data path between integer source 370 and carry propagate adder 314. Exclusive OR logic unit 372 also receives integer sign from unit 374, and where the integer sign is negative exclusive OR unit 372 inverts the bits of the integer. The integer sign is also stored in register 325.

Carry propagate adder 314 produces an incremented (S1) and unincremented result (S0). Both the incremented (S1) and unincremented (S0) results are received by select units 330 and 332. Slow rounding unit 336 chooses the result from select unit 332, while fast rounding unit 334 chooses the result from select unit 330. Fast rounding unit 334 and slow rounding units 336 receive the integer sign from register 325. The integer sign is also stored in register 353 between stages M and E. Where the integer sign is positive, fast rounding unit 334 and slow rounding unit 336 choose the unincremented result S0 from respective select units 330 and 332. However, if the integer sign is negative, the incremented result S1 is selected. Leading zero count unit 340 receives the selected number from select unit 330.

Exponent calculation unit 337 produces a resulting exponent $r_{exp}$, based on the integer size and the exponent bias, which are received at the operation input, as well as the leading zero count from leading zero count unit 340. The resulting exponent $r_{exp}$ is equal to: (integer size−1)+ (exponent bias of the output format)−(leading zero count), where the integer size is 64 or 32 for respective long and short integer formats, the exponent bias of the output format is 127 for single precision, 1023 for double precision, and 16383 for extended precision. Thus, for example to convert a long format (64 bit) integer to extended precision floating point, the resulting exponent $r_{exp}$ would be (64−1)+16383− (leading zero count). The resulting exponent $r_{exp}$ is then placed in register 351.

The number from register 352 is then packed at packing unit 358 as the mantissa, the resulting exponent $r_{exp}$ from register 351 is packed as the exponent, and the integer sign from register 353 is packed as the sign.

In addition, operation unit 300, shown in FIG. 7, may also be used to deflate a floating point number from one format to a smaller format, e.g., extended to double, double to single, or extended to single. The exponent is unpacked at unpacking unit 204 and flows through swapping unit 304 without being operated on, and is stored in register 319 as the larger exponent $e_l$. The sign is unpacked at unpacking unit 213 and is stored in register 325.

The mantissa is unpacked at unpacking unit 212 and the mantissa is stored in register 320 as well as received by carry propagate adder 314 without being operated on by swapping unit 306 or shifting unit 316. A rounding offset is introduced at offset unit 312. The rounding offset has a number of zeros to the right of a one. The number of zeros is dependent on the starting precision format and the desired end precision format. Thus, where the format is being deflated from extended precision format to double precision format, there would be (64−52−1) or 11 zeros after the one, where 64 is the number of bits in the mantissa in extended format and 52 is the number of bits in the mantissa in double format. Where the format is being deflated from extended format to single format there are (64−23−1) or 40 zeros after the one and for double format to single format there are (52−23) or 29 zeros after the one. Carry propagate adder 314 produces an incremented result that is stored in register 324.

The unincremented number from register 320 and the incremented number from register 324 are received by select unit 332. Slow rounding unit 336 selects whether to use the incremented or unincremented result from select unit 332. The selected number is placed in register 352. Because the number was normalized when unpacked at unpack unit 212, there are no leading zeros, and the leading zero count unit 340 can be bypassed, thereby saving power.

The exponent calculation unit 337 produces a resulting exponent $r_{exp}$ that is equal to the exponent $e_l$ stored in register 319 minus an exponent bias of the input format plus the exponent bias of the output format, i.e., $e_l$−(exponent bias of the input format)+(exponent bias of the output format). The exponent bias is 127 for single precision, 1023 for double precision, and 16383 for extended precision. The input and output format units are received by exponent calculation unit 337 at the operation input. Thus, for example, to deflate from extended precision to double precision, the resulting exponent $r_{exp}$ is equal to $e_l$−16383+ 1023. The resulting exponent $r_{exp}$ is stored in register 351.

The sign stored in register 325 flows through block 342 without being operated upon and is stored in register 353.

The result stored in register 352 is then packed in packing unit 358 as the mantissa, along with the resulting exponent $r_{exp}$ stored in register 351, and the sign stored in register 353.

Although the present invention has been described in considerable detail with reference to certain versions thereof, other versions are possible. Therefore, the spirit and scope of the appended claims should not be limited to the description of the versions depicted in the figures.

What is claimed is:

1. A floating point unit comprising:
   a first adding unit receiving a first set of data from a first data path and a second set of data from a second data path, wherein said first adding unit produces a sum of said first data and said second data;
   a rounding unit coupled to said first adding unit, wherein said rounding unit receives at least one least significant bits of said sum, and said rounding unit produces a carry in bit and at least one rounded least significant bit;
   an incremented sum unit coupled to said first adding unit, wherein said incremented sum unit produces an incremented sum; and
   a multiplexer coupled to said first adding unit, said incremented sum unit, and said second adding unit, wherein said multiplexer receives the carry in bit to select one of said sum and said incremented sum;
   wherein said at least one rounded least significant bit is united with the selected one of said sum and said incremented sum.

2. The floating point unit of claim 1, wherein:
   said first adding unit comprises a half add unit, said half add unit produces a sum on a third data path and a carry on a fourth data path; and
   a third adding unit coupled to said third data path and said fourth data path, said third adding unit receives the remaining most significant bits of said sum and the remaining most significant bits of said carry, said third adding unit produces an unincremented sum;

wherein said at least one rounded least significant bit is united with the selected one of said unincremented sum and said incremented sum.

3. The floating point unit of claim 2, wherein said third adding unit includes said incremented sum unit.

4. The floating point unit of claim 2, wherein:
said first adding unit and said rounding unit are disposed in one stage in said floating point unit; and
said third adding unit, said incremented sum unit, and said multiplexer are disposed in a separate stage in said floating point unit.

5. The floating point unit of claim 2, further comprising:
an inverting logic unit disposed in said second data path, said inverting logic unit inverting said second set of data during a subtraction operation;
a first formatting unit disposed in said third data path, said first formatting unit shifting said remaining most significant bits of said sum during a subtraction operation; and
a second formatting unit disposed in said fourth data path, said second formatting unit shifting said remaining most significant bits of said carry during a subtraction operation.

6. The floating point unit of claim 2, further comprising an overflow detection unit coupled to said third data path and said fourth data path.

7. A method of rounding comprising:
generating a sum of a first set of data and a second set of data;
separating at least one least significant bit of said sum from the remaining bits of said sum;
generating at least one rounded least significant bit of said sum;
generating an incremented sum of said remaining bits of said sum;
selecting one of said sum and said incremented sum;
uniting said at least one rounded least significant bit and the selected one of said sum and said incremented sum.

8. The method of claim 7, further comprising:
generating a carry of said first set of data and said second set of data;
separating at least one least significant bit of said carry;
generating at least one rounded least significant bit based on said at least one least significant bit of said sum and said at least one least significant bit of said carry;
summing the remaining significant bits of said sum and the remaining significant bits of said carry to generate an unincremented sum;
summing the remaining significant bits of said sum and the remaining significant bits of said carry to generate an incremented sum; and
selecting one of said unincremented sum and said incremented sum;
wherein uniting said at least one rounded least significant bit and the selected one of said sum and said incremented sum comprises uniting said at least one rounded least significant bit based on said at least one least significant bit of said sum and said at least one least significant bit of said carry with the selected one of said unincremented sum and said incremented sum.

9. The method of claim 8, generating at least one rounded least significant bit based on said at least one least significant bit of said sum and said at least one least significant bit of said carry comprises:

generating at least one overflow rounded least significant bit in parallel with at least one nonoverflow rounded least significant bit; and
selecting one of said at least one overflow rounded least significant bit and said at least one nonoverflow rounded least significant bit to be said at least one rounded least significant bit.

10. The method of claim 9, further comprising:
detecting an overflow from said remaining significant bits of said sum and said remaining significant bits of said carry in parallel with said generating at least one overflow rounded least significant bit and said at least one nonoverflow rounded least significant bit; and
producing an unincremented overflow result and an incremented overflow result;
wherein said unincremented overflow result and said incremented overflow result are used in selecting one of said at least one overflow rounded least significant bit and said at least one nonoverflow rounded least significant bit to be said at least one rounded least significant bit.

11. The method of claim 10, further comprising generating a carry in bit using said unincremented overflow result, said incremented overflow result, said at least one least significant bit of said sum and said at least one least significant bit of said carry.

12. The method of claim 11, wherein said selecting one of said unincremented sum and said incremented sum uses said carry in bit.

13. The method of claim 8, further comprising:
inverting said second set of data prior to generating a sum of a first set of data and a second set of data; and
shifting the remaining significant bits of said sum and the remaining significant bits of said carry prior to generating said unincremented sum.

14. A floating point unit comprising:
means for producing a set of sum data and a set of carry data of a first data set and a second data set;
means for separating at least one least significant bit from said set of sum data and separating at least one least significant bit from said set of carry data;
means for rounding said at least one least significant bit from said set of sum data and said at least one least significant bit from said set of carry data;
means for generating an incremented sum and an unincremented sum of the remaining bits of said set of sum data and the remaining bits of said set of carry data,
means for selecting one of said unincremented sum and said incremented sum; and
means for combining the selected one of said unincremented sum and said incremented sum with the rounded at least one least significant bit.

15. The floating point unit of claim 14, wherein:
said means for producing a set of sum data and a set of carry data comprises a half add unit;
said means for rounding said at least one least significant bit from said set of sum data and said at least one least significant bit from said set of carry data comprises a rounding unit receiving said at least one least significant bit from said set of sum data and said at least one least significant bit from said set of carry data and generating said rounded at least one least significant bit, said rounding unit further producing a carry in bit; and
said means for generating an incremented sum and an unincremented sum is an adding unit.

16. The floating point unit of claim 15 wherein said means for selecting is a multiplexer storing said unincremented sum and said incremented sum, said means for selecting further comprising said carry in bit.

17. The floating point unit of claim 16 further comprising:
means for inverting said second set of data prior to producing said set of sum data and said set of carry data; and
means for shifting said set of sum data and said set of carry data to eliminate the largest significant bit in one of said set of sum data and set of carry data.

18. The floating point unit of claim 17 wherein:
said means for inverting comprises an exclusive OR logic unit receiving said second set of data and the arithmetic operation to be performed by said floating point unit; and
said means for shifting comprises a first shifting unit in the data path of said set of sum data and a second shifting unit in the data path of said set of carry data.

19. The floating point unit of claim 14, further comprising a means to detect an overflow condition in parallel with rounding said at least one least significant bit from said set of sum data and at least one least significant bit from said set of carry data.

20. The floating point unit of claim 19, wherein said means to detect an overflow condition comprises an adding unit receiving the remaining bits of said set of sum data and the remaining bits of said set of carry data.

* * * * *